Oct. 24, 1933.                R. WILLIAMS                1,931,597
         APPARATUS FOR CENTRIFUGALLY MOLDING CONCRETE
               BLOCKS, SLABS, AND LIKE ARTICLES
                       Filed July 27, 1932
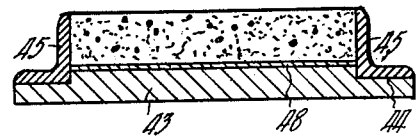
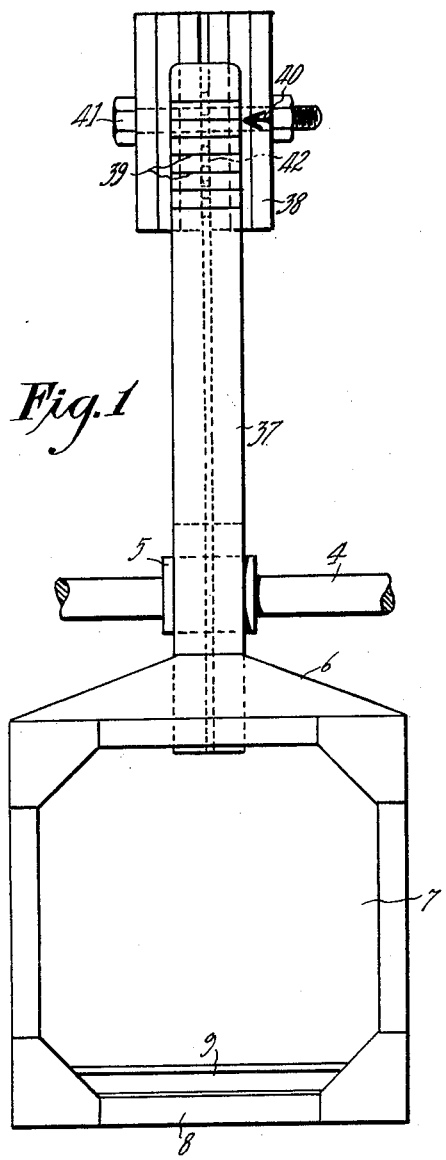
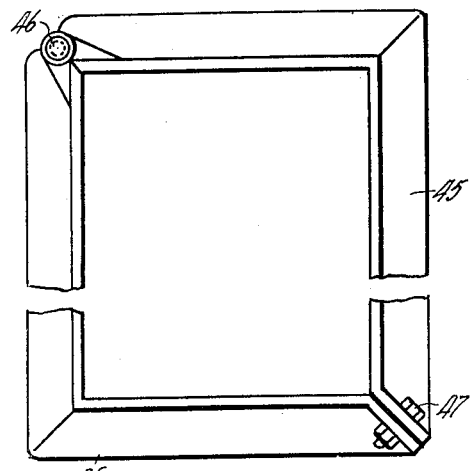
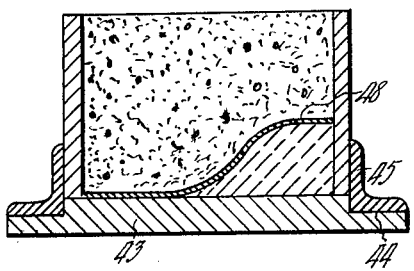
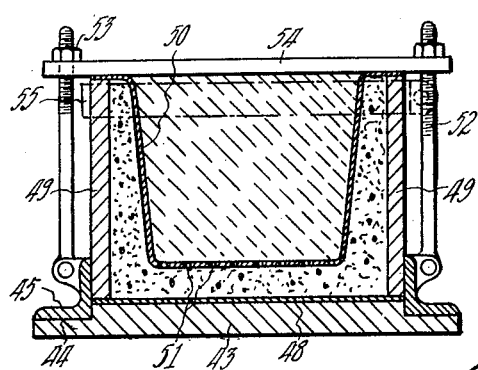
INVENTOR
R. WILLIAMS
BY
ATTY.

Patented Oct. 24, 1933

1,931,597

UNITED STATES PATENT OFFICE 1,931,597

APPARATUS FOR CENTRIFUGALLY MOLDING CONCRETE BLOCKS, SLABS, AND LIKE ARTICLES

Ralph Williams, Sydney, New South Wales, Australia

Application July 27, 1932, Serial No. 625,072, and in the Straits Settlements February 11, 1932.

3 Claims. (Cl. 25—41)

The object of the invention is to provide a special mold used in connection with a centrifugal molding apparatus, said mold having means whereby it may be easily opened and closed, means for increasing its depths or capacities and a detachable former and perforated core adapted to the production of hollow blocks or like articles. The invention also comprehends improvements in the details of construction and arrangement of parts to be hereinafter described and particularly pointed out in the claims.

In the accompanying explanatory drawing:—

Figure 1 is a side elevation of a molding apparatus with which the improved mold operates.

Figure 2 is a sectional view of a mold.

Figure 3 is a plan view of a special hinged mold.

Figure 4 is a section of a mold having an extension and a special former.

Figure 5 is a section of a mold having a detachable cover plate and a perforated core.

A boss or spider 5 is securely fixed to the shaft 4 midway between the bearings 3, and mounted on and rigidly fixed to the spider 5 is a revolvable frame 6 made of suitable structural steel. The shaft 4 passes along or is co-axial with the longitudinal axis of symmetry of the frame 6 so that said frame is symmetrically disposed about the shaft 4, as will be evident from Fig. 1.

In Fig. 1, a cage 7 is positioned at one side of the shaft 4 and is secured to a diametrically arranged beam or girder 37 made of structural steel and fixed rigidly to the boss or spider 5. The beam or girder 37 is extended on the opposite side of the shaft 4 and carries a radially adjustable counterpoise or balance weight 38. The beam or girder 37 is graduated as at 39 to indicate positions of the counterpoise 38 corresponding to different weights placed in the cage 7. The counterpoise 38 is provided with an indicator 40, which may be brought into alignment with any of the graduations 39 and is also provided with a bolt 41 adapted to be passed through the counterpoise 38 and through holes 42 in the beam 37 corresponding to the various graduations.

The mold as set out in Figures 1, 2, 3, 4 and 5 consists of a base board or plate 43 made of suitable timber or metal is provided and formed with a rabbet 44 around its edges. The rabbet 44 accommodates angle strips 45 which form the sides of the mold 13. In order that the mold 13 may be readily opened and closed the angle strips 45 extending along one of its ends and sides may be formed integrally. The two angular strips so made may be hinged as at 46 at a corner of the mold and detachably secured by a bolt 47 or other fastening at the opposite corner thereof, as shown in Fig. 3.

A metal plate 48 is placed within the mold 13 in contact with the base 43 in order to protect the same from the wearing action of the concrete material and to provide a smooth surface on the finished blocks or slabs. The plate 48 may be straight or curved—see Fig. 3—or ornamented to produce corresponding impressions on the molded blocks or slabs.

The mold 13 may be provided with extensions 49 to increase their depth, if required.

Core plates 50 of any required shape may be positioned in the mold 13 for the production of hollow blocks or articles, and holes or perforations 51 may be made in the core plates to permit excess water to escape. The extensions 49 and core plates 50 may be secured in position on the mold 13 by swinging bolts 52 pivoted on the angle strips 45 and having nuts 53 on their free ends adapted to be tightened upon a cover plate or closure 54.

In order that the extended mold 13 may be readily opened and closed, the extensions 49 may be made in separate pieces which after assembly in the mold may be secured together by a detachable peripheral band 55.

Blocks, slabs and like articles formed and consolidated by centrifugal action in the gyrating molds 13 are very strong and dense in character, and are hard and smooth and capable of receiving a high polish, so that they are very useful for architectural and other constructional purposes, and for paving road surfaces and footpaths.

What I do claim is:—

1. In centrifugal molding apparatus of the character described, a mold having a base board or plate, a rabbet formed around the base board or plate, an angle strip fitting and extending around the rabbet, detachable extension plates fitting within the angle strip, a peripheral band around the extension plates, clamping bolts pivoted on the angle strips, a cover plate adapted to be held in place by the clamping bolts, a core plate extending into the mold and secured by the cover plate, and perforations in the core plate.

2. In a centrifugal molding apparatus of the character described, a mold having a base board, a rabbet formed around the base board, a removable metal plate adapted to rest on said base board and serve as a wearing plate for the mold, an angle strip fitting and extending around the rabbet, detachable extension plates fitting within the angle strip, a peripheral band around the extension plates, clamping bolts pivoted on the angle strips, a cover plate adapted to be held in place by the clamping bolts, a core plate extending into the mold and secured by the cover plate, and perforations in the core plate.

3. A centrifugal molding apparatus as claimed in claim 2, wherein the removable metal plate may be formed to provide a configuration on the bottom of the molded article.

RALPH WILLIAMS.